Jan. 15, 1924.

C. LE G. FORTESCUE 1,480,716

PHASE BALANCING SYSTEM

Filed Oct. 24, 1922

WITNESSES:
O. M. Cochran
O. B. Buchanan

INVENTOR
Charles Le G. Fortescue
BY
Wesley G. Carr
ATTORNEY

Patented Jan. 15, 1924.

1,480,716

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

PHASE-BALANCING SYSTEM.

Application filed October 24, 1922. Serial No. 596,597.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Phase-Balancing Systems, of which the following is a specification.

My invention relates, in general, to systems of phase balancing and it has particular relation to the problem of providing a method of, and an apparatus for, deriving balanced polyphase energy from a polyphase supply line and supplying a plurality of unbalanced single-phase loads.

With this object in view, my invention relates particularly to systems employing an auxiliary polyphase line, across the respective phases of which a plurality of single-phase loads are connected, the said auxiliary line being tied to the main supply line through a series balancing machine, and the voltages on the respective single-phase loads being individually regulated, if desired, to maintain predetermined voltage conditions.

My invention consists in the phase-balancing system and in the details of structure and operation described in the following specification and illustrated in the accompanying drawing, wherein—

Figure 1:
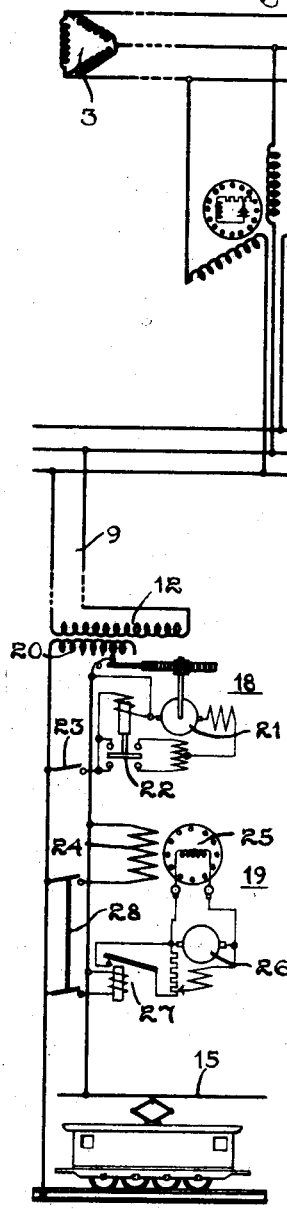
Figure 2:
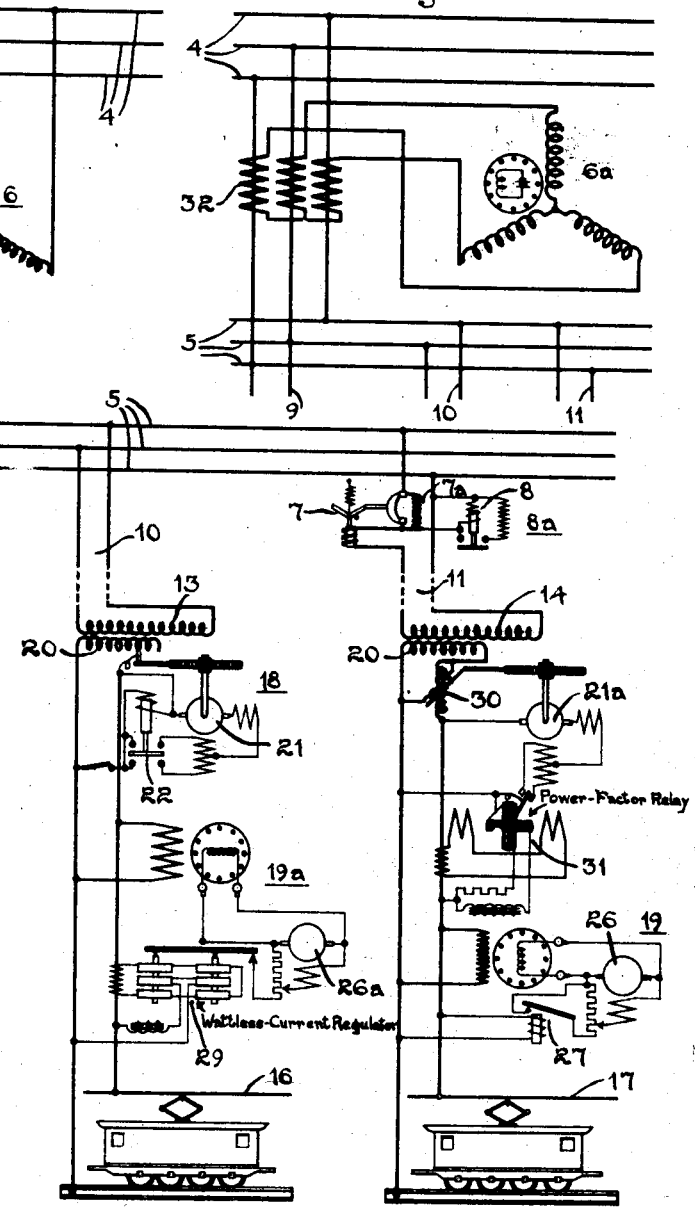

Figure 1 is a diagrammatic view of circuits and apparatus embodying my invention in a preferred form and Fig. 2 is a less detailed view illustrating a slightly modified connection.

Considerable thought and money have been expended in an effort to develop the most economical and the most reliable system for supplying a plurality of single-phase loads, such, for example, as a plurality of single-phase railway lines radiating from a distributing center, from a balanced polyphase transmission line, without unbalancing the latter. Heretofore, an effort has been made to meet the problem by connecting the single-phase loads directly across the polyphase line and then balancing the line through suitable balancing apparatus. An objection to such plan is that the transmission line, if it supplies induction motors, as it always does, must be balanced very accurately in order to prevent the circulation of large wattless currents in the induction motors and consequent overheating of such motors. Furthermore, if a lamp load is supplied from the polyphase line, as frequently happens, momentary fluctuations in voltage, resulting from the sluggishness of the automatic regulators in responding to sudden changes in the unbalanced load, produce very objectionable flickering in the lamps. Moreover, the mechanism for maintaining and establishing perfect balancing is quite complicated and expensive.

According to my invention, therefore, I do not connect the single-phase loads directly across the polyphase supply line but I employ an auxiliary polyphase line to which the single-phase loads are connected, and I tie together the auxiliary line and the supply line through a series balancing machine which has the property of permitting the interchange of only balanced direct-rotational currents.

In the drawing is shown a polyphase source 3, supplying a transmission line 4, which may be either balanced or unbalanced, so far as my invention is concerned. The only consideration of the purchaser of the polyphase power is that only balanced currents shall be withdrawn from the polyphase line, so that no unbalancing shall be caused by the load devices of the purchaser. I, provide, therefore, an auxiliary polyphase line 5, which will be set up in the purchaser's station, and I interconnect the auxiliary line with the supply line through a series balancing machine 6.

The series balancer is simply an induction motor having a very small air gap and having the best possible damper winding or short-circuited secondary winding, the magnetic coupling between the rotor and the stator being as perfect as possible and the ohmic resistance of the damper windings being as small as possible. The series machine is rotated backwardly, by itself or by auxiliary means (not shown), at substantially synchronous speed.

Since any unbalanced polyphase current may be resolved into a balanced positive-phase-sequence or direct-rotational component and a balanced negative-phase-sequence or counter-rotational component, it is evident that the series machine will offer a synchronous impedance, or a very high impedance, to the flow of the counter-rotational currents, but, by reason of the very close magnetic coupling and the low internal resistance, the machine will offer a very low impedance to the flow of the direct-rotational currents. Thus, only balanced currents are drawn from the polyphase supply line by the unbalanced single-phase loads.

If the counter-rotational component does not fall below a certain minimum value, the series machine will lock into step and operate by itself without external driving means, when it is once started. Preferably, the series machine is provided with an exciting winding which should be energized to such a degree as to take up the magnetization losses due to the negative-phase-sequence currents. Practically, however, the excitation of the series balancer may conveniently be adjusted in accordance with the normal condition of unbalance and left unchanged throughout the operation of the machine.

The effect of the series balancer is to maintain the currents substantially perfectly balanced. Consequently, if the impedances of the load devices connected across the respective phases are different, the voltages across the respective phases will be unbalanced in inverse proportion to the respective single-phase loads. If the single-phase loads are approximately equal, the voltage variation will not be very great, but the voltages on the respective phases will fluctuate with every change in any of the single-phase load currents. It will usually be necessary, therefore, to provide some sort of means in the single-phase lines for maintaining the desired voltage conditions at the consuming ends.

In this connection, it may be mentioned also that the protective apparatus should be arranged in such manner that a defective phase is never open-circuited, because the series machine 6 operates in this respect similarly to a current transformer and would be damaged by the very high resultant voltage in the open-circuited phase. I have, therefore, shown a circuit breaker 7 in series with one of the single-phase loads, said circuit breaker being shunted by means of a suitable impedance device 7a for preventing the abnormal voltage conditions referred to. I have also shown a relay 8, operating under excessive voltage conditions to close-circuit a defective single-phase line through a predetermined impedance 8a. Protective apparatus such as that described will be included in all of the phases.

I have shown three single-phase feeder lines 9, 10 and 11 connected, at their remote ends, to step-down transformers 12, 13 and 14, respectively, said transformers supplying single-phase railway lines 15, 16 and 17, respectively. The voltages at the respective railway lines may be individually regulated in any manner desired. The voltage of the line 15 is shown as being regulated either by means of a device for changing the transformation ratio, indicated at 18, or by means of a suitably controlled single-phase synchronous condenser, indicated at 19.

The transformer-controlling device 18 comprises a secondary winding 20 having a plurality of taps and a cooperating contact member which is adjusted in position by means of a small series commutator motor 21 which is energized in the one or the other direction, in accordance with departures of the voltage from a predetermined condition, by means of a voltage regulator indicated symbolically at 22. A switch 23 is shown in circuit with the voltage regulator 22 in order to render the apparatus 18 inoperative in case the synchronous condenser 19 is utilized to control the voltage.

The synchronous condenser 19 has a primary winding 24, which is connected across the line, and a direct-current exciting winding 25 which is energized from an exciter 26, the voltage of which is controlled by means of any voltage regulator 27 energized across the line. The synchronous converter operates to control the voltage by drawing leading or lagging wattless currents of sufficient magnitude to produce the desired voltage conditions in the railway line 15. The primary winding 24 and the voltage regulator 27 may be disconnected from the line by means of a switch 28 when the apparatus 18 is employed to control the voltage.

A slightly different control system is shown, by way of example, for regulating the voltage of the single-phase line 16. In this case, the voltage is maintained at an average predetermined value by means of the regulating apparatus 18 for changing the transformer taps as hereinbefore described. The single-phase synchronous converter 19a, however, is controlled in accordance with the wattless current or the power factor of the single-phase line 16, in such manner as to reduce the circulating wattless currents to a minimum and, at the same time, compensate in some measure, for the sluggishness of the response of the motor 21 associated with the transformer regulating apparatus 18. A wattless-current regulator of a conventional type is indicated at 29 for the purpose of controlling the voltages of the exciter 26a for the synchronous condenser 19a. As the particular construction of the regulator is not essential to my invention, no particular description thereof, is necessary.

A still further modification of the voltage control is shown in connection with the single-phase line 17. In this case, the step-down transformer 14 is not provided with adjusting taps but an induction regulator 30 is provided for controlling the voltage. The single-phase condenser 19 is provided, as in the first-mentioned control system, being regulated by means of a voltage regulator 27 to maintain a constant voltage on the single-phase line. In order to limit the circulating wattless currents necessary to be drawn by the condenser 19 in order to control the line voltage, I have shown a conventional means for regulating the induction regulator 30 in response to the power factor of the line, so that, if the power factor departs, in either direction, from unity or other predetermined value the regulator will be automatically adjusted to buck or to boost the voltage as may be necessary. The regulating means shown comprises a small series motor 21a mechanically connected to the induction regulator 30 and energized, in the one or the other direction, by means of a power-factor relay of any known construction, which is indicated schematically at 31.

In Figure 2, I have illustrated the general features of my invention in skeleton and I have shown, by way of illustration, the series balancer 6a connected, through current transformers 32, to the interconnecting lines 33 which tie together the supply line 4 and the auxiliary line 5. By virtue of the action of the current transformers 32, the series balancer may be designed for the most advantageous voltage and current values without reference to the actual conditions in the interconnecting lines 33.

While I have referred to a polyphase supply line and an auxiliary polyphase line, I mean to include, by said terminology, any polyphase source, or the conductors connected thereto, and any auxiliary conductors or terminals which have a closed polygon of electromotive forces across the respective phases. Furthermore, while I have avoided circumlocution by describing and claiming my invention with reference to a polyphase source and a plurality of single-phase loads, it will be understood that the broad principles of my invention are applicable to a plurality of single-phase sources supplying a polyphase load. I desire, therefore, that my claims shall be construed to cover also the case in which some or all of the single-phase circuits constitute a negative load or a source of supply.

From the foregoing description, it will be apparent that many changes and substitutions may be resorted to by those skilled in the art without departing from the general plan of my invention. I desire, therefore, that my invention shall be broadly construed to cover any system which is fairly embraced by the language of the accompanying claims when read in the light of the prior art.

I claim as my invention:

1. The method of operating a plurality of feeder lines for independently variable single-phase loads from a polyphase supply line which consists in maintaining an instantaneous balance in the currents drawn from the supply line and independently regulating the feeder lines for maintaining an average predetermined ratio between the magnitudes of the electromotive-forces applied to the respective loads.

2. The method of operating a plurality of unbalanced single-phase loads from a polyphase supply line which consists in regulating the respective load currents drawn from the supply line to maintain current balance at the expense of voltage unbalance and adjustably and individually transforming the resultant unbalanced voltages to maintain predetermined voltage conditions on the respective single-phase loads.

3. The method of operating a plurality of unbalanced single-phase loads from a polyphase supply line with which is associated a dynamo-electric series phase balancer in series circuit relation to the load currents, said method comprising adjustably transforming the resultant unbalanced voltages to maintain predetermined voltage conditions on the respective single-phase loads.

4. The method of operating a plurality of unbalanced single-phase loads from a polyphase supply line, said single-phase loads being connected to an auxiliary unbalanced polyphase line which is tied to said supply line through a series polyphase machine having a good damper winding rotating backwardly at substantially synchronous speed, said method comprising individually regulating the respective single-phase voltages applied to the loads.

5. The combination with a polyphase supply line and a plurality of single-phase load lines, of means for maintaining an instantaneous balance in the currents drawn from the supply line and electro-responsive means for maintaining an average predetermined ratio between the magnitudes of the electromotive forces applied to the respective load lines.

6. The combination with a polyphase supply line and a plurality of single-phase load lines, of means for maintaining an instantaneous balance in the currents drawn from the supply line and means for individually adjusting the voltages in the respective single-phase lines.

7. The combination with a polyphase supply line and a plurality of single-phase load lines, of means for regulating the respective load currents to maintain current balance at the expense of voltage unbalance and electro-responsive means for adjustably transforming the resultant unbalanced voltages to maintain predetermined voltage conditions on the respective single-phase loads.

8. The combination with a polyphase supply line and a plurality of single-phase load lines, of means for regulating the respective load currents to maintain current balance at the expense of voltage unbalance and means for individually adjusting the voltages in the respective single-phase lines.

9. The combination with a polyphase supply line and a plurality of single-phase load lines, of a dynamo-electric series balancer associated in series circuit relation to the load currents, and electro-responsive means for adjustably transforming the resultant unbalanced voltages to maintain predetermined voltage conditions on the respective single-phase loads.

10. The combination with a polyphase supply line and a plurality of single-phase load lines, of a dynamo-electric series balancer associated in series circuit relation to the load currents, and means for individually adjusting the voltages in the respective single-phase lines.

11. The combination with a polyphase supply line, of an auxiliary unbalanced polyphase line, a plurality of single-phase load lines energized from the respective phases of said auxiliary line, interconnecting means for tieing together said supply line and said auxiliary line for the interchange of power, and a dynamo-electric series balancer associated in series relation to said interconnecting means, said series balancer comprising a polyphase machine having a good damper winding rotating backwardly at substantially synchronous speed.

12. The combination with a polyphase supply line, of an auxiliary unbalanced polyphase line, a plurality of single-phase load lines energized from the respective phases of said auxiliary line, interconnecting means for tieing together said supply line and said auxiliary line for the interchange of power, a dynamo-electric series balancer associated in series relation to said interconnecting means and means whereby the respective single-phase voltages in the load lines may be individually adjusted.

13. The combination with a series balancer machine, of a single-phase circuit breaker associated in series circuit relation therewith, and an impedance device shunted around said circuit breaker for limiting the voltage-rise in that phase.

14. The combination with a polyphase source and a plurality of single-phase lines, of a series balancer machine interposed therebetween for selectively impeding the flow of negative-phase-sequence currents, and protective means for preventing the open-circuiting of any phase while the other phases are supplying currents.

15. The combination with a polyphase source and a plurality of single-phase lines, of a series balancer machine interposed therebetween for selectively impeding the flow of negative-phase-sequence currents, and means responsive to excessive single-phase voltages for close circuiting a defective phase through a predetermined impedance.

In testimony whereof, I have hereunto subscribed my name this 28th day of September 1922.

CHARLES LE G. FORTESCUE.